US008622871B2

(12) United States Patent
Hoff (10) Patent No.: US 8,622,871 B2
(45) Date of Patent: Jan. 7, 2014

(54) CONTROL ARRANGEMENT AND METHOD OF CONTROLLING A TRANSMISSION IN A MACHINE

(75) Inventor: Brian D. Hoff, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 12/973,413

(22) Filed: Dec. 20, 2010

(65) Prior Publication Data

US 2012/0157253 A1    Jun. 21, 2012

(51) Int. Cl.
F16H 61/40 (2010.01)
F16H 47/04 (2006.01)
G06F 7/00 (2006.01)

(52) U.S. Cl.
USPC .................................. 477/68; 475/80; 701/66

(58) Field of Classification Search
USPC .................. 475/72, 80, 83; 477/3, 52, 68, 98; 701/62, 66; 74/665 A, 665 B, 730.1
See application file for complete search history.

(56) References Cited

U.S. PATENT DOCUMENTS

| 3,732,755 | A | * | 5/1973 | Beig et al. ..................... 477/131 |
| 4,382,392 | A | | 5/1983 | Meyerle et al. |
| 4,519,275 | A | | 5/1985 | Maruyama et al. |
| 4,610,179 | A | * | 9/1986 | Parker .............................. 74/335 |
| 5,120,283 | A | | 6/1992 | Bogdan |
| 5,403,241 | A | * | 4/1995 | Jarchow et al. ................. 475/72 |
| 5,910,067 | A | * | 6/1999 | Vandendriessche et al. ... 477/92 |
| 6,135,916 | A | | 10/2000 | Vorndran et al. |
| 7,094,177 | B2 | * | 8/2006 | Inoue et al. ..................... 477/34 |
| 7,530,913 | B2 | | 5/2009 | Febry et al. |
| 7,530,914 | B2 | | 5/2009 | Febry et al. |
| 2006/0150809 | A1 | * | 7/2006 | Shah ............................... 91/472 |
| 2006/0172853 | A1 | * | 8/2006 | Ishibashi et al. ................ 477/52 |
| 2009/0132135 | A1 | | 5/2009 | Quinn, Jr. et al. |
| 2009/0222181 | A1 | * | 9/2009 | Lindgren et al. ................ 701/64 |
| 2009/0234546 | A1 | | 9/2009 | Inoue et al. |
| 2010/0168956 | A1 | * | 7/2010 | Ueno .............................. 701/34 |
| 2011/0160969 | A1 | * | 6/2011 | Oguri et al. .................... 701/52 |

FOREIGN PATENT DOCUMENTS

JP          2004301264          10/2004

* cited by examiner

*Primary Examiner* — Roger Pang
(74) *Attorney, Agent, or Firm* — Leydig, Voit & Mayer (57) ABSTRACT

The disclosure is directed to a method for use in a machine having a transmission having an operational mode, and including first and second power source paths, and a combined power output. The first power source path includes a variator. The method of controlling the transmission includes operating the first power source path, providing a signal indicative of the operational mode of the transmission to a controller, and at least partially neutralizing the variator if the signal indicates that the transmission is in neutral for at least a preset period of time.

19 Claims, 6 Drawing Sheets

CONTROL ARRANGEMENT AND METHOD OF CONTROLLING A TRANSMISSION IN A MACHINE

TECHNICAL FIELD

This patent disclosure relates generally to split torque variable transmissions, and, more particularly, to a control arrangement for and a method of controlling a transmission in a machine including a split torque continuously variable transmission.

BACKGROUND

Split torque continuously variable transmissions (CVT), such as multi-range hydromechanical transmissions, are frequently utilized in mobile machines. Hydromechanical transmissions, for example, may include a hydraulic pump and motor in the form of a variator U.S. Pat. No. 7,530,913 to Fabry, et al., which is assigned to the assignee of this disclosure, discloses a multirange hydromechanical transmission that includes a hydraulic pump coupled to a hydraulic motor. Torque from the engine is transmitted to the pump and a parallel mechanical shaft to a planetary gearing arrangement and a plurality of gears, clutch assemblies, and synchronizers. When the transmission is engaged, such arrangements may be configured such that the variator is flowing when the machine is stationary, i.e., at zero ground speed. Maintaining the transmission in this configuration, then results in wasted fuel when the machine is idle. Depending on the configuration of the variator, these losses can be on the order of 20% of the idle fuel burn. This fuel consumption becomes particularly significant when the machine spends a considerable portion of its use at idle.

The disclosed method and control system are directed to overcoming one or more of the problems set forth above.

SUMMARY

The disclosure describes, in one aspect, a method for use in a machine comprising a transmission having an operational mode, and including first and second power source paths, and a combined power output. The first power source path includes a variator. The method of controlling the transmission comprises the steps of: operating the first power source path; providing a signal indicative of the operational mode of the transmission to a controller; and at least partially neutralizing the variator if the signal indicates that the transmission is in neutral for at least a preset period of time.

The disclosure further describes, in another aspect, a control system in a variable transmission of a machine. The transmission has an operational mode, and includes first and second power source paths, and a combined power output. The first power source path includes a variator. The control system comprises a selectively adjustable operational mode selector adapted to supply a signal indicative of a selected operational mode, a timer adapted to provide signal indicative of time lapse, and an actuator adapted to control an operative state of at least a portion of the first power source path. The control system further comprises a controller in electrical communication with the actuator. The controller is adapted to receive the signal indicative of the selected operational mode. The controller is further configured to supply a signal to the actuator to at least partially neutralize at least a portion of the variator if the signal indicative of the selected operational mode indicates that the transmission is in neutral for at least a preset period of time.

The disclosure also describes, in yet another aspect, a machine comprising a transmission and a controller. The transmission has an operational mode, and includes first and second power source paths, and a combined output from the first and second power source paths. The first power source path includes a pump and a motor (variator). The transmission further includes a selectively adjustable operational mode selector adapted to supply a signal indicative of the selected operational mode, a timer adapted to provide signal indicative of time lapse, and an actuator adapted to control an operative state of at least a portion of the first power source path. The controller is in electrical communication with the actuator and is adapted to receive the signal indicative of the selected operational mode. The controller is further configured to supply a signal to the actuator to at least partially neutralize at least a portion of the variator if the signal indicative of the selected operational mode indicates that the transmission is in neutral for at least a preset period of time.

BRIEF DESCRIPTION OF THE DRAWING(S)

The accompanying drawings, which are incorporated in and constitute a part of this specification, illustrate exemplary embodiments of the disclosure and, together with the description, serve to explain the principles of the disclosure.

DETAILED DESCRIPTION

This disclosure relates to a method of operating a variator, and a control system and machine (shown generally as reference numeral 10) incorporating the same in a split torque arrangement in a continuously variable transmission. The method, system, and machine 10 have universal applicability to any machine 10 utilizing such an arrangement. For example, the term "machine" may refer to any machine 10 that performs some type of operation associated with an industry such as, for example, mining, construction, farming, transportation, or any other industry known in the art. By way of example only, the machine 10 may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine 10, and may be driven from the transmission.

Figure 1:
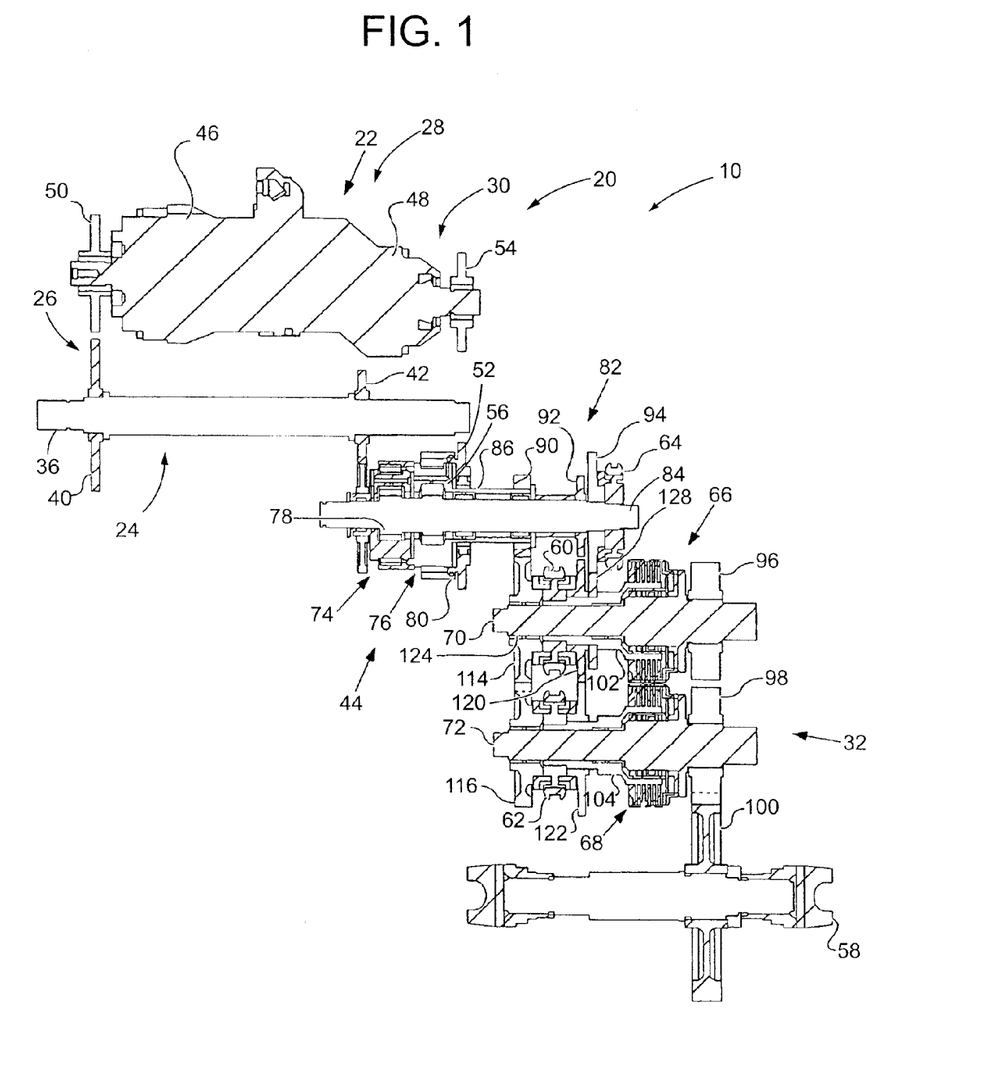
FIG. 1 illustrates a sectional view of a transmission.

Referring to FIG. 1, there is illustrated a partial cross-sectional view of an exemplary continuously variable transmission 20 with which the method may be utilized. While a specific embodiment of a continuously variable transmission 20 is described herein, the continuously variable transmission may be of any type having appropriate components for performance of the method disclosed herein. The disclosed arrangement includes first and second power source paths 22, 24. For example, the continuously variable transmission 20 may be a hydromechanical transmission 26 including a hydrostatic transmission 30 and a mechanical transmission 32.

While this disclosure explains a hydromechanical transmission 26 in detail, any appropriate alternate arrangement may be utilized. By way of example and not limitation, the hydrostatic transmission 30 may be embodied as an alternate power source path, such as, for example, an electric motor driving an electro-mechanical transmission (not shown), an electric battery and a motor (not shown), a hydraulic accumulator and a motor (not shown), an electric generator and electric motor (not shown), or other device capable of providing input power, without departing from the scope of the present disclosure.

An engine 34 (see FIG. 2) drives the hydromechanical transmission 26. The engine 34 may be, for example, an internal combustion engine, although the engine 34 may be any kind of device capable of powering the continuously variable transmission 20 as described herein. The engine 34 outputs to both the hydrostatic transmission 30 and the mechanical transmission 32 through an input member 36. The input member 36 provides split power to the hydrostatic transmission 30 and a planetary arrangement 44 of the mechanical transmission 32 through first and second fixed input gears 40, 42, respectively (see FIG. 1). The hydrostatic transmission 30 and planetary arrangement 44 then provides outputs to the mechanical transmission 32 through a planetary output shaft assembly 82. The planetary arrangement 44 includes first and second axially aligned planetary gear sets 74, 76, each first or second axially aligned planetary gear set 74, 76 including a sun gear 78, a carrier 56, and a ring gear 80, as is customary.

The term "fixed" may be understood as being integral with, permanently attached, pinned, interconnected through a splined connection, or fused by welding, for example, or by any other means known to those having ordinary skill in the art.

The hydrostatic transmission 30 includes a variator 28 that includes a variable displacement pump 46 and a motor 48, which is in fluid communication with the pump 46. Displacement of the pump 46 may be controlled by a swash plate 47, as is known in the art, or by an alternate arrangement (see FIG. 2). The angle of the swash plate 47 may be controlled by an actuator 49, which may be of any appropriate design.

The variable displacement pump 46 is connected to the engine 34, through a hydrostatic transmission input gear 50 engaged with the first fixed input gear 40 (see FIG. 1). The motor 48 may be variable displacement or fixed displacement, as illustrated. The motor 48 outputs through a hydrostatic transmission output gear 54 to a second planetary input member 52 to the planetary arrangement 44. Thus, the pump 46 of the hydrostatic transmission 30 uses the split input power from the engine 34 to fluidly drive the motor 48 to convert the input power from the engine 34 to hydrostatic output power over a continuously variable speed ratio.

The hydromechanical transmission 26 includes a second fixed input gear 42 coupled to the input member 36, the second fixed input gear 42 providing input to the planetary arrangement 44 by way of a carrier 56. The planetary arrangement 44 combines the hydrostatic output power from the first power source path 22 to second planetary input member 52 with the split input mechanical power from second power source path 24 by way of the second fixed input gear 42 to provide hydromechanical output power to mechanical transmission 32 through the planetary output shaft assembly 82. The illustrated planetary output shaft assembly 82 includes an internal shaft 84 and an aligned sleeve 86, such as a hollow member or hub, supported by the internal shaft 84. The output to the internal shaft 84 and sleeve 86 is dependent upon the arrangement and connections of the components of the first and second axially aligned planetary gear sets 74, 76. In the illustrated embodiment, the sleeve 86 outputs through a first planetary output gear 90. The internal shaft 84 outputs through a second planetary output gear 92 and through an auxiliary drive gear 94.

The speed and torque in each of the ranges initially set by gear ratios of the planetary arrangement 44 and mechanical transmission 32 can be continuously varied within a given operational mode by varying the output speed of the hydrostatic transmission 30. Thus, the mechanical transmission 32 allows multiple selectable operational modes that allow a wide range of speed and torque operation, while the continuously variable ability of hydromechanical transmission 26 through output from hydrostatic transmission 30 through the planetary arrangement 44 allows continuously variable speed and torque control within a given operational mode. This allows for application of hydromechanical output power through a continuously variable speed and torque range to a load, such as, for example, one or more driving wheels of a vehicle, or tracks of an earth-working machine. The speed and torque in each of the power source paths 22, 24 ranges initially set by gear ratios of the planetary arrangement 44 can be infinitely varied by varying the stroke of the hydrostatic transmission 30. In other words, the planetary arrangement 44 provides output to a final output member 58 by way of a plurality of gears, synchronizing assemblies or synchronizers 60, 62, 64, clutch assemblies 66, 68, and first and second output members 70, 72.

The output from the planetary output shaft assembly 82 is transmitted by way of a plurality of rotatably mounted gears 90, 92, 94, 114, 116, 120, 122, 128, synchronizers 60, 62, 64, hubs 102, 104, and clutch assemblies 66, 68 to one or the other of the first and second output members 70, 72, and on to the final output member 58. The first and second output members 70, 72 are in the form of rotatably mounted shafts to which first and second output shaft gears 96, 98 are fixedly mounted, respectively. The first and second output shaft gears 96, 98 are mounted to mesh with a final drive gear 100, which, in turn, is fixedly mounted to the final output member 58. In this way, rotation from the first and second output members 70, 72 is imparted to the final output member 58 by way of first and second output shaft gears 96, 98, respectively, and the final drive gear 100. In other words, the planetary arrangement 44 provides a choice of planetary outputs to the mechanical transmission 32 including the final output member 58 by way of a plurality of gears 90, 92, 94, 96, 98, 100, 114, 116, 120, 122, 128, synchronizers 60, 62, 64, aligned sleeves or hubs 102, 104, first and second clutch assemblies 66, 68, and first and second output members 70, 72.

Figure 2:
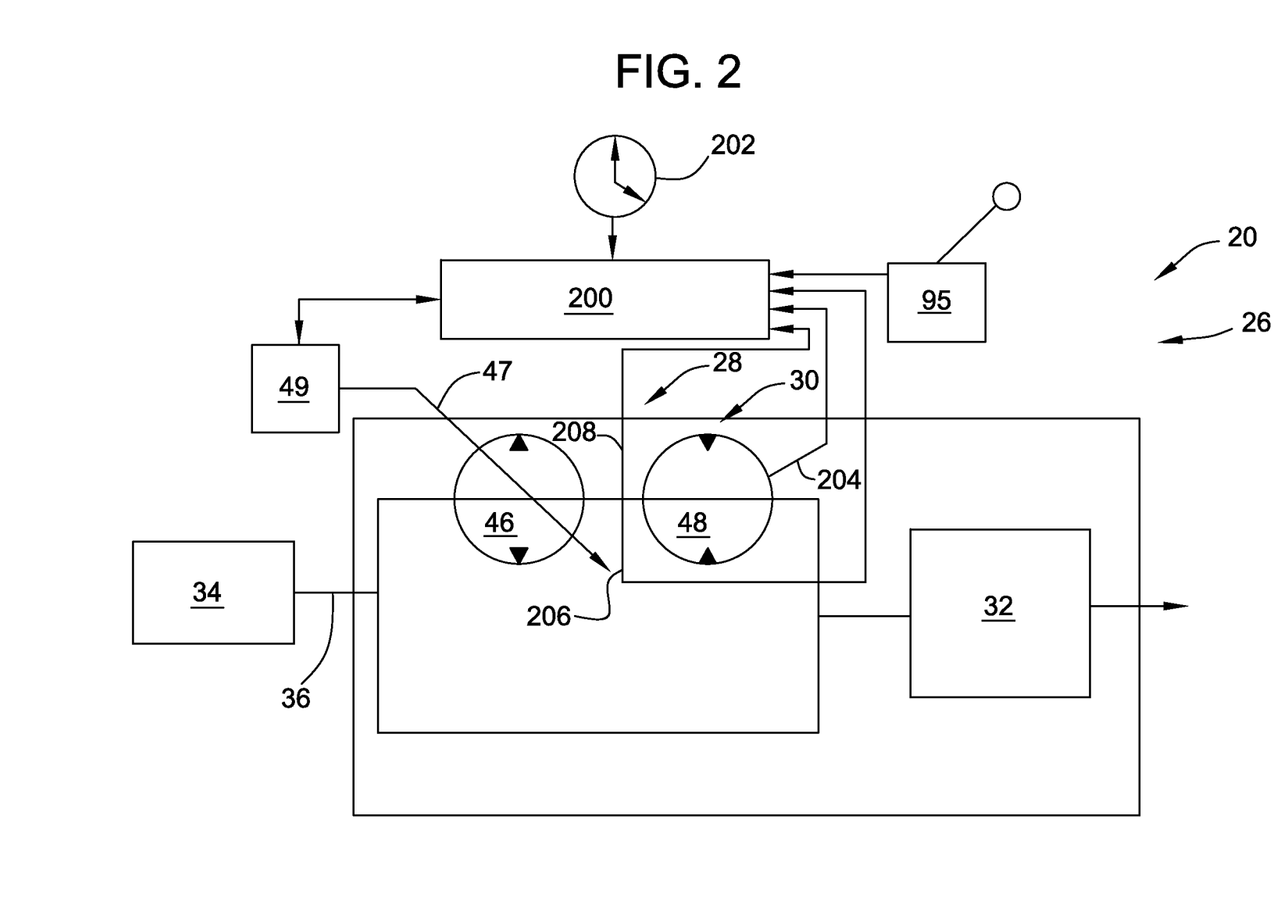
FIG. 2 illustrates a schematic illustration of an exemplary embodiment of a control system according to the disclosure.

In operating the transmission 20, the operator (not shown) may select the desired gear by way of a selectively adjustable operational mode selector 95 (see FIG. 2). In various embodiments, the operator may chose from operational modes such as Park, Neutral, Low Forward, High Forward, Low Reverse, High Reverse, and Auxiliary Forward.

Referring to FIG. 2, in operation, a signal is provided to a controller 200 indicating the selected operational mode, which corresponds to a particular gear configuration. The signal may be, for example, from the operational mode selector 95 or from an alternate sensor, as will be understood by those of skill in the art.

The transmission 20 may optionally include further input to the controller 200. For example, one or more temperature sensors 204, 206, 208 or the like may provide signals to the controller 200 indicative of the temperature of the variator 28. For example, such a temperature sensor 204 may be provided to measure the temperature of the pump 46, or the motor 48, as illustrated, or any other location that would provide an indication of the temperature of the variator 28. Alternately, temperature sensors 206, 208 may be disposed to measure the temperature of the oil flowing into or out of the motor 48, respectively.

The controller 200 is in electrical communication with the actuator 49, and is configured to supply a signal to the actuator 49. In this way, the controller 200 is configured to supply a signal to the actuator 49 that is indicative of the desired displacement of the pump 46, and, therefore, the angle of the swash plate 47. The displacement of the pump 46, in turn, controls the output of the motor 48. The controller 200 may also include an internal timer, or an external timer 202 may be further provided.

The controller 200 may include a processor (not shown) and a memory component (not shown). The processor may be microprocessors or other processors as known in the art. In some embodiments, the processor may be made up of multiple processors. The processor may execute instructions for control of the first power source path 22, in this embodiment, by way of the actuator 49. Such instructions may be read into or incorporated into a computer readable medium, such as the memory component or provided external to processor. In alternative embodiments, hard-wired circuitry may be used in place of or in combination with software instructions to implement the method disclosed herein. Thus, embodiments are not limited to any specific combination of hardware circuitry and software.

The term "computer-readable medium" as used herein refers to any medium or combination of media that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or processor can read.

The memory component may include any form of computer-readable media as described above. The memory component may include multiple memory components.

The controller 200 may be enclosed in a single housing, or it may include a plurality of components operably connected and enclosed in a plurality of housings. The controller 200 may be located on-board an engine, machine, or vehicle. In still other embodiments the controller 200 may be located in a plurality of operably connected locations including on-board an engine, on-board a machine or vehicle, and remotely.

According to the disclosed method (e.g., FIG. 3) and control system, a signal indicative of the condition of the selected operational mode is provided to the controller 200 by way of the operational mode selector 95 or an alternate sensor. In the illustrated embodiment, the operational mode selector 95 provides a signal indicating the selected operational mode to the controller 200. The controller 200 then determines whether the selected operational mode is "Neutral." If the selected operational mode is not "Neutral," no modification is made to the variator 28 along the first power source path 22 based upon the disclosed method. Alternatively, if the selected operational mode is "Neutral," then the controller 200 determines if the selected operational mode has been "Neutral" for at least a preselected period of time. If the selected operational mode has been "Neutral" for at least the preset period of time, then the controller 200 sends a signal to neutralize the variator 28. In the disclosed embodiment, the controller 200 sends a signal to the actuator 49 to adjust the swash plate 47 to minimize the displacement of the pump 46, thus minimizing the motion of the motor 48. Thus, the controller 200 is adapted to receive a signal indicative of the selected operational mode, and configured to supply a signal to the actuator 49 to at least partially neutralize at least a portion of the variator 28 if the signal indicative of the selected operational mode indicates that the selected operational mode is "Neutral" for at least a preset period of time.

Figure 3:
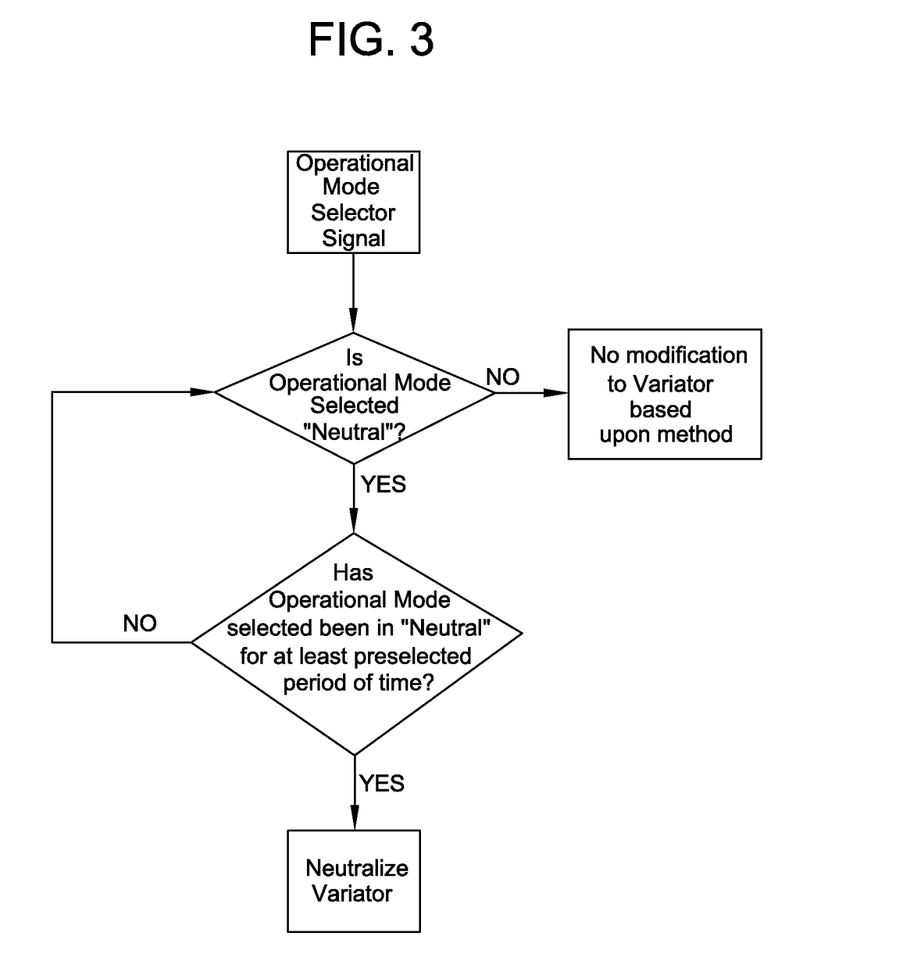
FIG. 3 is a flow chart of an exemplary method for operating a variator according to the disclosure.

The preset period of time may be any appropriate period of time adequate to indicate that the operational mode selector 95 would be placed immediately into an alternate operational mode. For example, the preset period of time may be on the order ten seconds, although the preset period of time may be greater or lesser than ten seconds. For example, the preset period may be on the order of five, six, seven, eight, nine, eleven, twelve, thirteen, fourteen, or fifteen or more seconds. The preset period may be a greater or lesser time period, however.

According to another feature of the disclosure, the method may be dependent upon additional input, that is, other conditions may be identified that must be met before the variator 28 is neutralized. For example, operation of the variator 28 while in the "Neutral" mode may assist in warming oil in the system. Thus, in an embodiment illustrated in FIG. 4, the variator 28 is only neutralized under the disclosed method once the variator 28 is warmed up or has reached a preset temperature. In this way, the absolute temperature of the variator 28 as measured by the sensor 204 may be utilized. Alternately, the temperature of oil flowing from the variator 28 as measured by the sensor 208 may be utilized.

Figure 4:
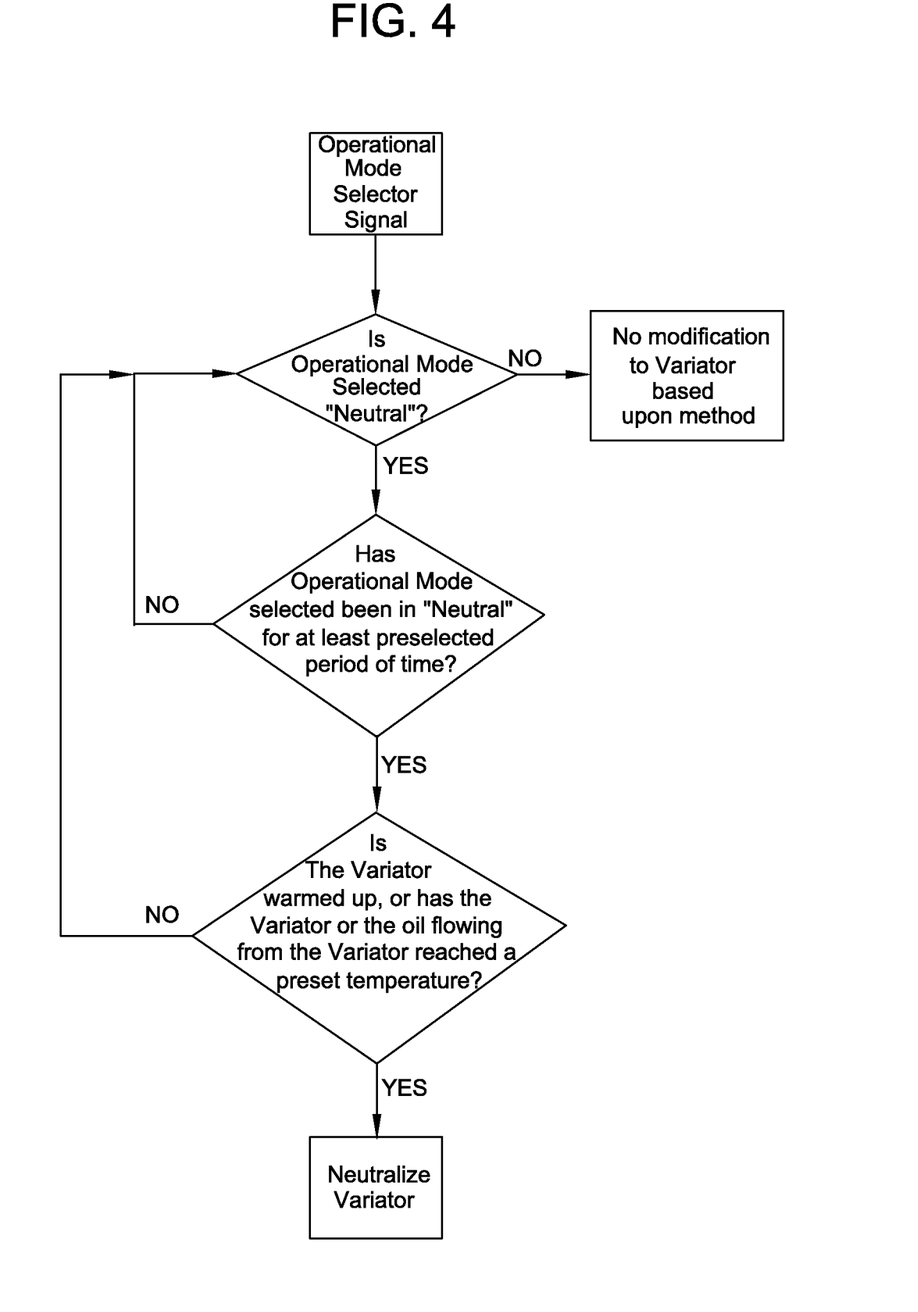
FIG. 4 is a flow chart of an alternate embodiment of an exemplary method for operating a variator according to the disclosure.
Figure 5:
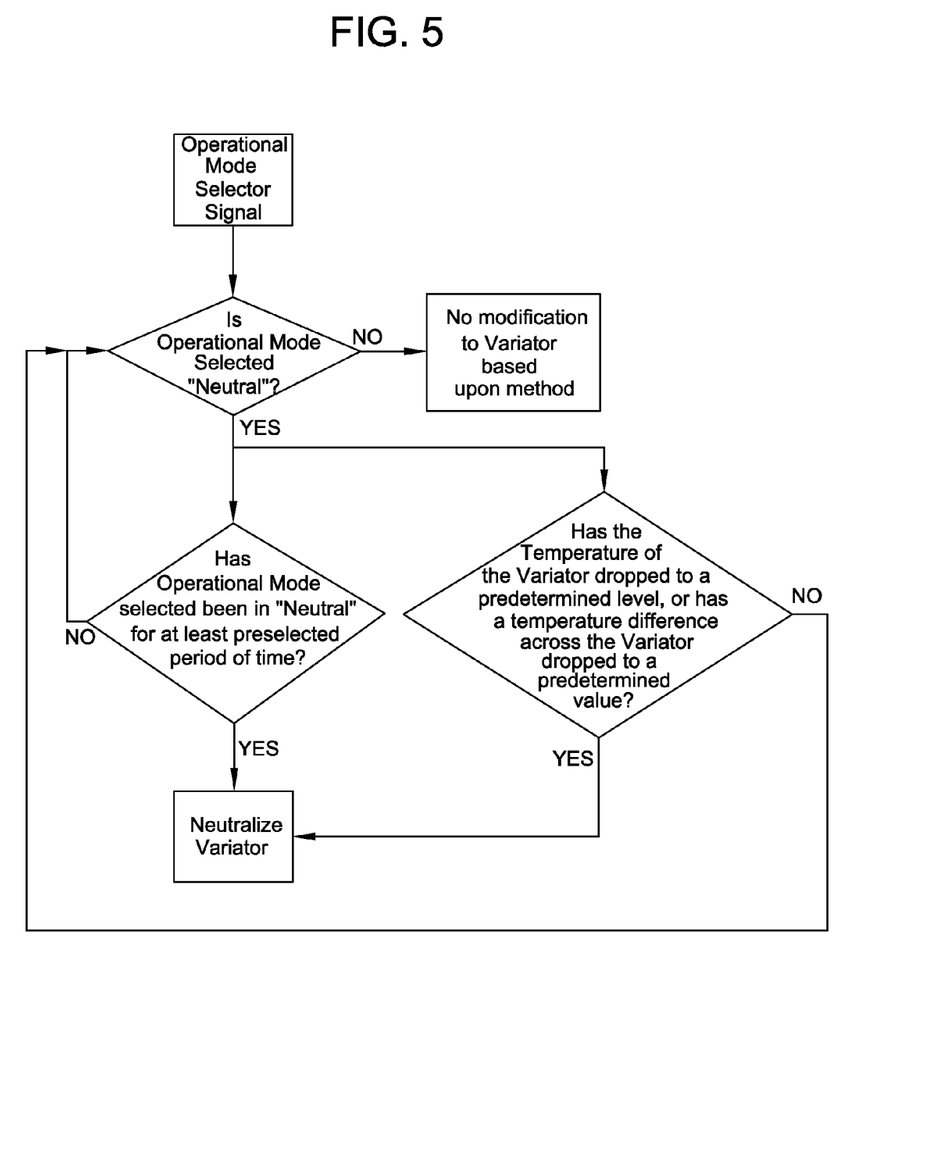
FIG. 5 is a flow chart of a further alternate embodiment of an exemplary method for operating a variator according to the disclosure.
Figure 6:
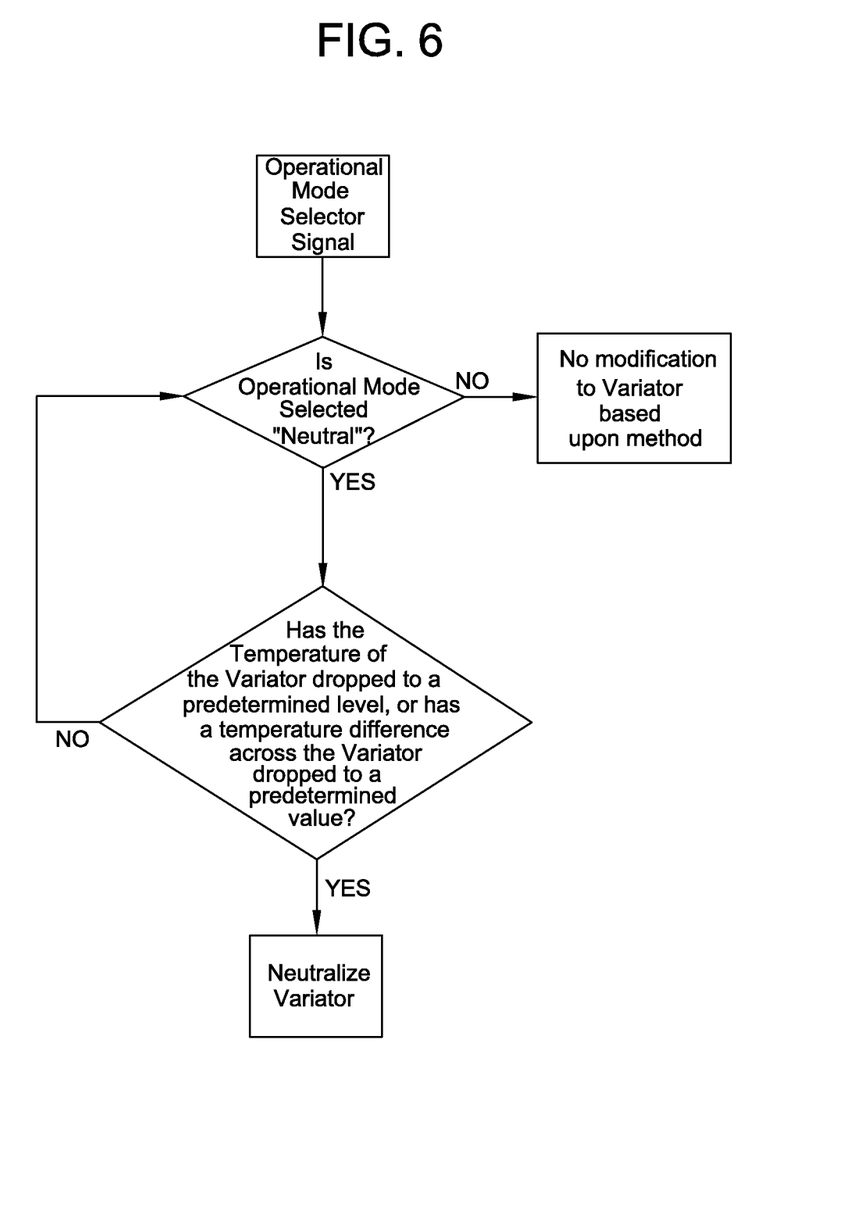
FIG. 6 is a flow chart of a yet another alternate embodiment of an exemplary method for operating a variator according to the disclosure.

By way of another example, alternate criterion may be utilized for neutralization of the variator 28. As illustrated in FIG. 5, once the operational mode selected is "Neutral," changes in temperature may be utilized in determining whether it is appropriate to neutralize the variator 28. That is, if the temperature of the variator 28 has dropped to a predetermined level, as measured, for example by the sensor 204, or the temperature difference across the variator 28, as measured by the sensors 206, 208, for example, has dropped to a predetermined value, the variator 28 may be neutralized. As illustrated in FIG. 4, the neutralization of the variator 28 may additionally be dependent upon the sufficient warming of the variator 28. Additionally, as illustrated in FIG. 6, the method need not necessary include logic based upon time lapse.

INDUSTRIAL APPLICABILITY

The present disclosure is applicable to transmissions 20 utilizing first and second power source paths 22, 24. For example, the disclosure is applicable to hydromechanical transmissions, and transmissions utilizing a hydrostatic transmission 30 or alternate arrangement, such as, for example, an electric motor proving an electro-mechanical transmission (not shown), an electric battery and a motor (not shown), a hydraulic accumulator and a motor (not shown), an electric generator and electric motor (not shown), or other device capable of providing input power.

Transmissions 20 incorporating dual power source paths 22, 24 may spend a considerable amount of operating time in neutral. Maintaining maximum flow from the variator 28, however, may result in significant fuel consumption. The disclosed method and/or control arrangement may result in fuel savings without objectionable delay when the transmission 26 is placed into a forward or reverse operational mode from neutral.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. In a machine comprising a transmission having an operational mode selector and including first and second power source paths, and a combined power output, the first power source path including a variator, a method of controlling the transmission comprising the steps of:
    operating the first power source path;
    providing a signal indicative of a selected operational mode of the transmission to a controller;
    timing a length of time that the operational mode selector is in neutral;
    determining if the variator has reached a preset temperature; and
    at least partially neutralizing the variator if the signal indicates that the operational mode selector is in neutral for at least a preset period of time.

2. The method according to claim 1, wherein the preset period of time is at on the order of ten seconds.

3. The method according to claim 1, wherein the first power source path includes a pump and motor.

4. The method according to claim 3, wherein the first and second power source paths output to a planetary gear arrangement.

5. The method according to claim 3, wherein the neutralizing step includes reducing the output of the pump.

6. The method according to claim 5, wherein the preset period of time is on the order of ten seconds.

7. The method according to claim 5, wherein the reducing step includes adjusting a swash plate of the pump.

8. The method according to claim 7, wherein reduction in the output of the pump at least partially neutralizes the motor.

9. The method according to claim 8 wherein the adjusting step includes operation of an actuator to adjust the swash plate.

10. The method according to claim 1, wherein the timing step is performed by a controller.

11. The method according to claim 1, wherein the timing step is performed by a timer separate from a controller.

12. The method according to claim 1, further including the step of determining if a temperature difference across the variator has dropped to a preset value.

13. The method according to claim 1, wherein the first power source path includes at least one of the following: an electric motor driving an electro-mechanical transmission, an electric battery and a motor, a hydraulic accumulator and a motor, and an electric generator and electric motor.

14. A control system in a variable transmission of a machine, the transmission having an operational mode, and having first and second power source paths, and a combined power output, the first power source path including a variator, the control system comprising:
    a selectively adjustable operational mode selector adapted to supply a signal indicative of a selected operational mode;
    a timer adapted to provide a signal indicative of time lapse;
    at least one temperature sensor disposed to determine a temperature of the variator;
    an actuator adapted to control an operative state of at least a portion of the variator; and
    a controller in electrical communication with the actuator and adapted to receive the signal indicative of the selected operational mode and a signal indicative of the temperature of the variator, the controller being configured to determine if the variator has reached a preset temperature, the controller being configured to supply a signal to the actuator to at least partially neutralize at least a portion of the variator if the signal indicative of the selected operational mode indicates that the operational mode selector is in neutral for at least a preset period of time.

15. The control system according to claim 14, wherein the preset period of time is on the order of ten seconds.

16. The control system according to claim 14, wherein the first power source path includes a pump and a motor.

17. The control system according to claim 16 wherein the pump includes a swash plate disposed at an angle in the pump, and the actuator is disposed to control the angle of the swash plate.

18. A machine comprising
    a transmission including
    a first power source path including a variator including at least one of a pump and a motor;
    a second power source path;
    a combined power output from said first and second power source paths;
    a selectively adjustable operational mode selector adapted to supply a signal indicative of a selected operational mode; and
    an actuator adapted to control an operative state of at least a portion of the variator;
    a timer adapted to provide a signal indicative of time lapse;
    at least one temperature sensor disposed to determine a temperature of the variator, and a controller in electrical communication with the actuator and adapted to receive the signal indicative of the selected operational mode and a signal indicative of the temperature of the variator, the controller being configured to determine if the variator has reached a preset temperature, the controller being configured to supply a signal to the actuator to at least partially neutralize at least a portion of the variator if the signal indicative of the selected operational mode indicates that the operational mode selector is in neutral for at least a preset period of time.

19. The machine according to claim 18, wherein the preset period of time is on the order of ten seconds, and the pump includes a swash plate disposed at an angle within the pump, the actuator being disposed to control the angle of the swash plate.

\* \* \* \* \*